March 9, 1926.
G. A. NEHRHOOD
MEANS FOR SHELLING NUTS
Filed Oct. 13, 1922
1,576,244
12 Sheets-Sheet 4
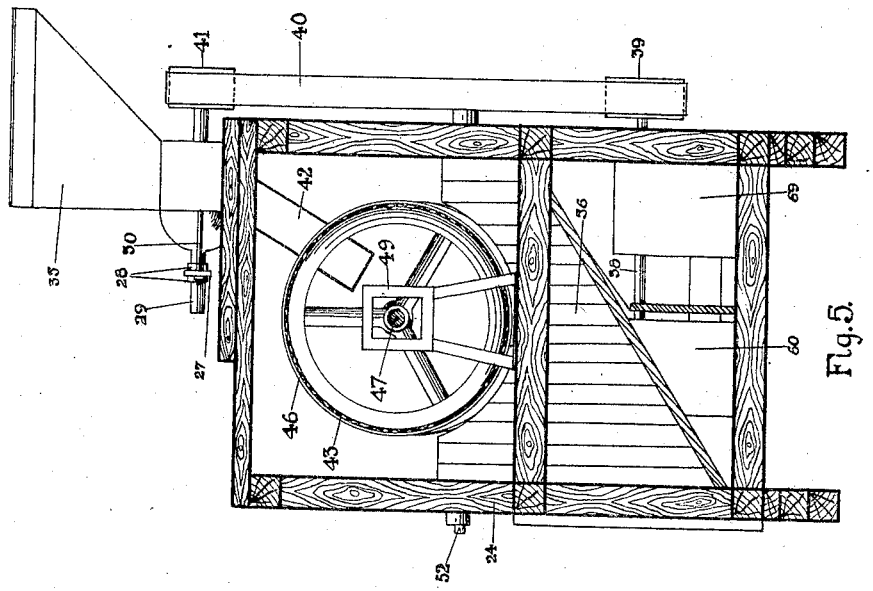
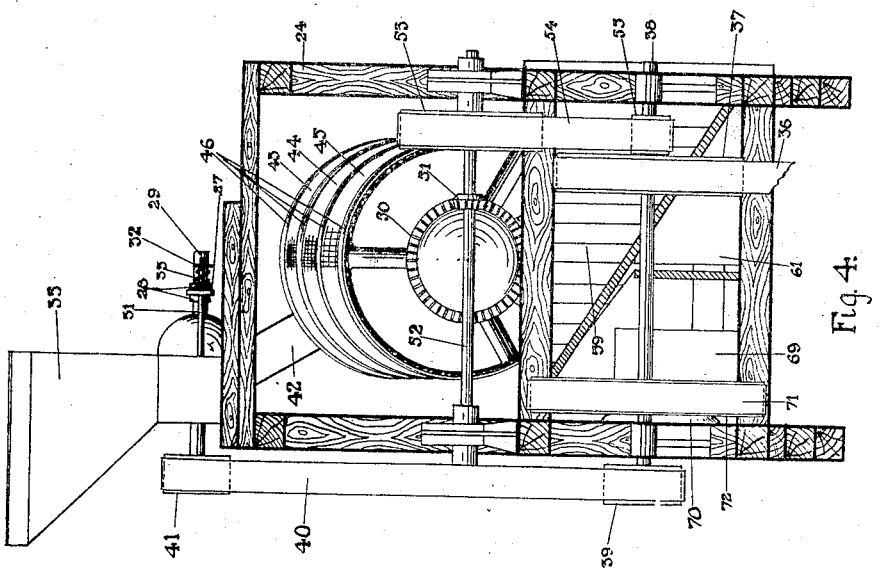
Inventor
George A Nehrhood
by
Barnett & Numan
Attorneys March 9, 1926. 1,576,244

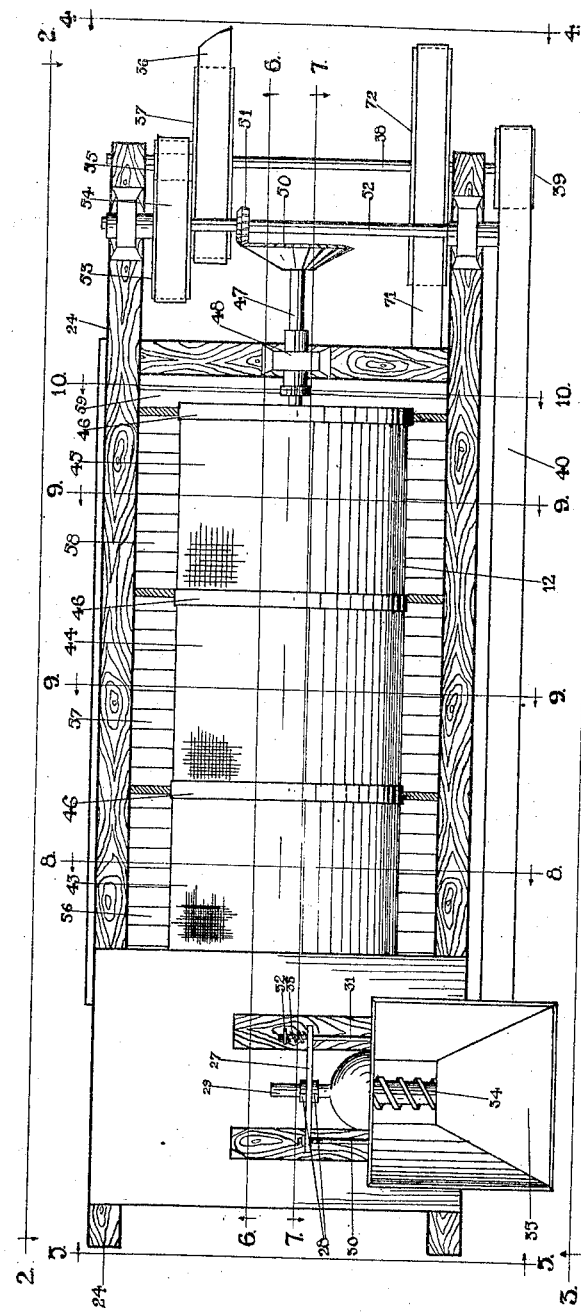

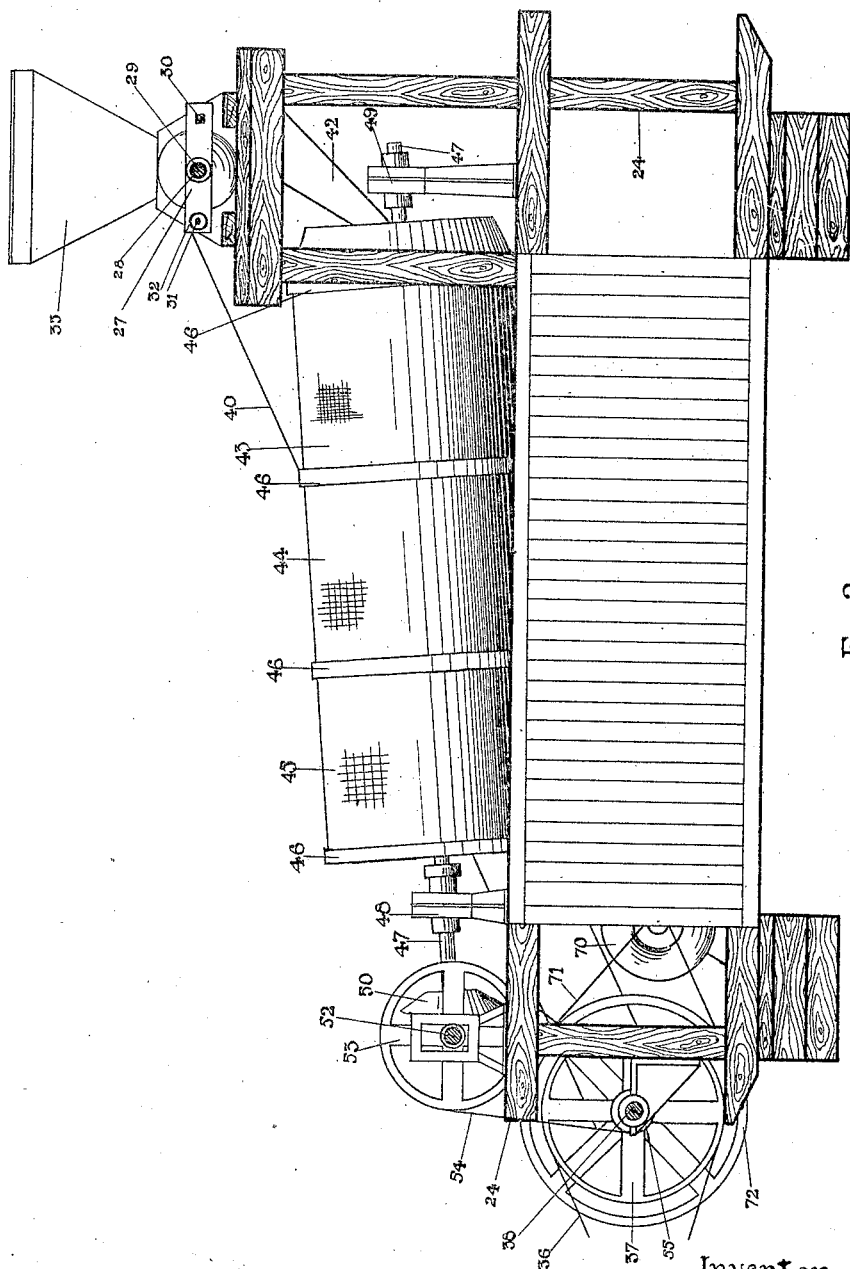

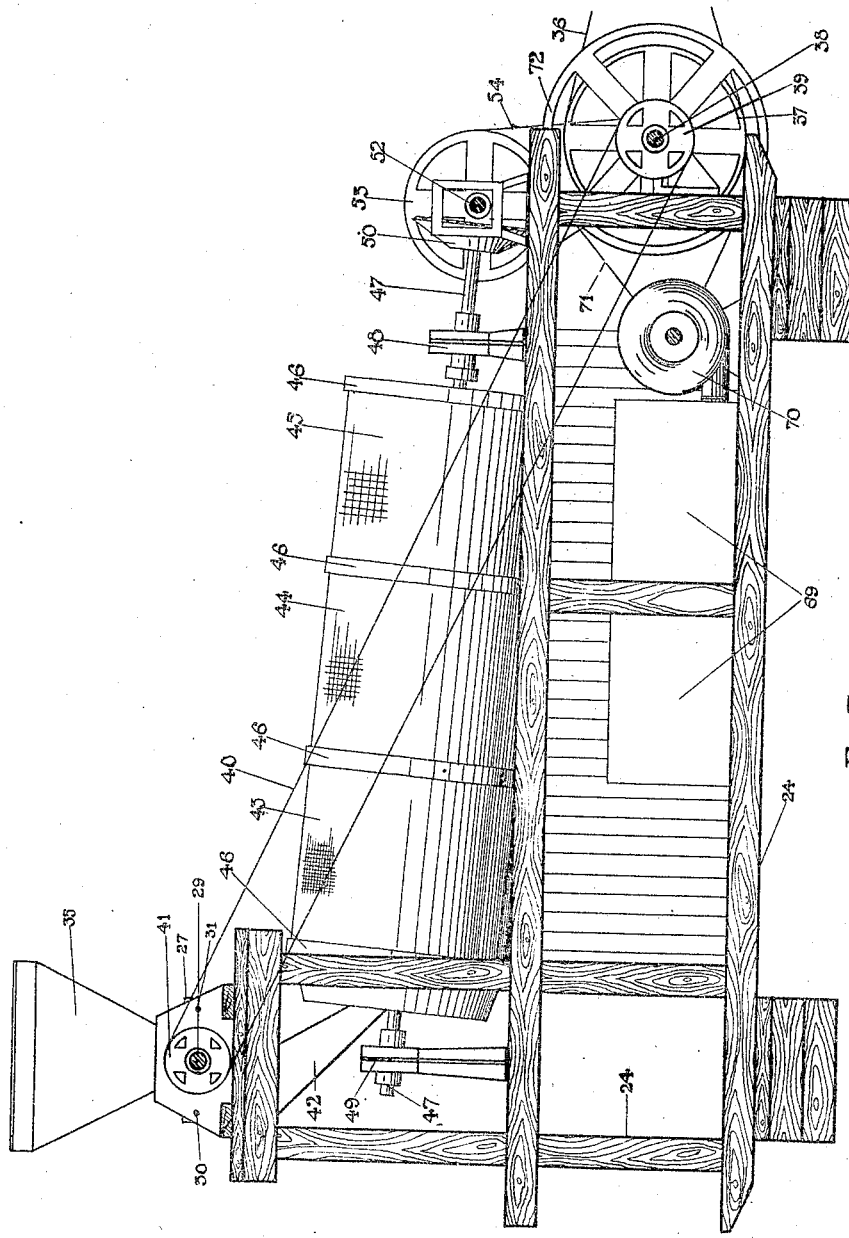

G. A. NEHRHOOD
MEANS FOR SHELLING NUTS
Filed Oct. 13, 1922 12 Sheets-Sheet 5

Inventor
George A Nehrhood
by
Barnett Truman
Attorneys.

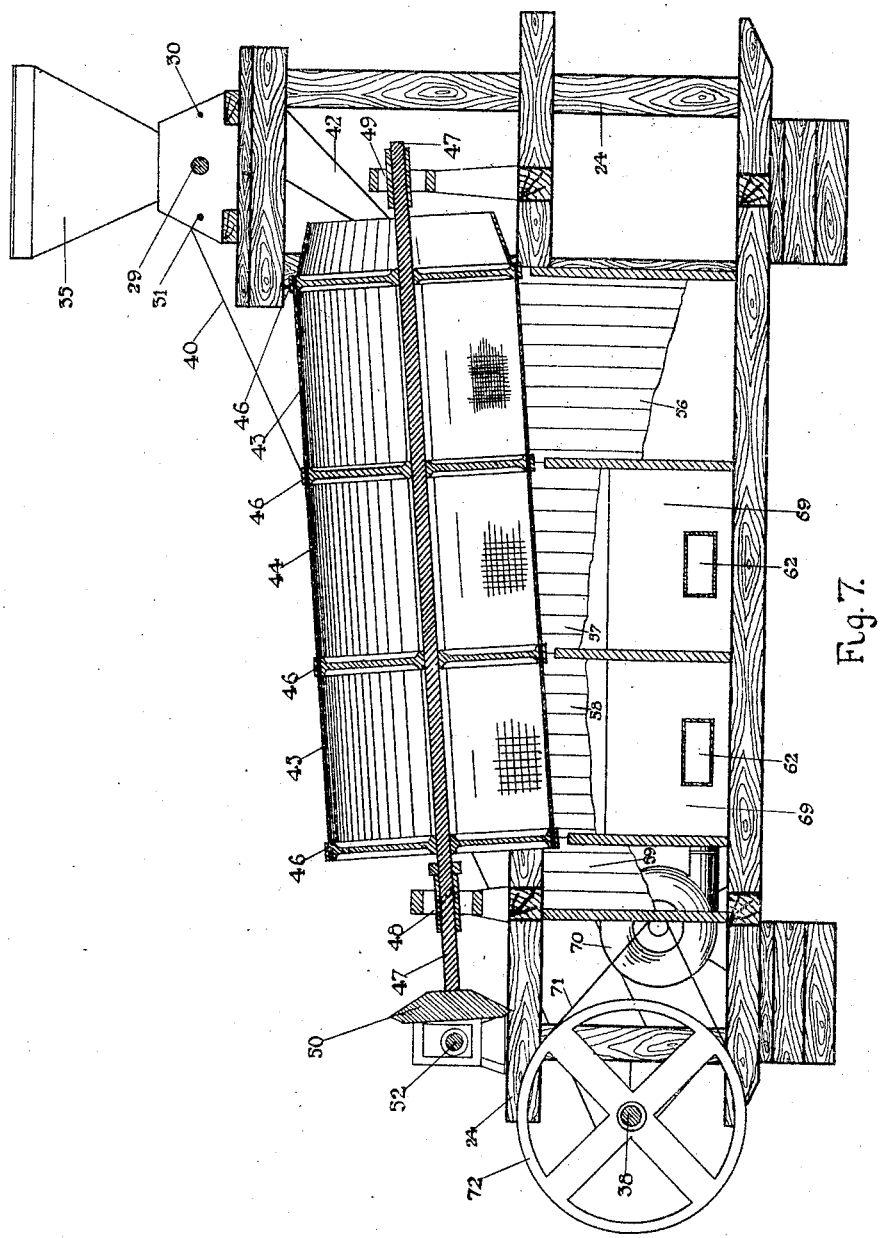

March 9, 1926.

G. A. NEHRHOOD

MEANS FOR SHELLING NUTS

Filed Oct. 13, 1922

Inventor
George A Nehrhood
by
Barnett &
Attorneys.

March 9, 1926.

G. A. NEHRHOOD 1,576,244

MEANS FOR SHELLING NUTS

Filed Oct. 13, 1922

Inventor
George A. Nehrhood
by
Attorneys.

March 9, 1926.

G. A. NEHRHOOD 1,576,244

MEANS FOR SHELLING NUTS

Filed Oct. 13, 1922

Inventor
George A Nehrhood
by
Barnett & Truman
Attorneys

March 9, 1926.

G. A. NEHRHOOD

MEANS FOR SHELLING NUTS

Filed Oct. 13, 1922

Inventor
George A Nehrhood
by
Barnett & Truman
Attorneys.

March 9, 1926.

G. A. NEHRHOOD 1,576,244

MEANS FOR SHELLING NUTS

Filed Oct. 13, 1922      12 Sheets-Sheet 11

Inventor
George A Nehrhood
by
Barnett & Truman
Attorneys.

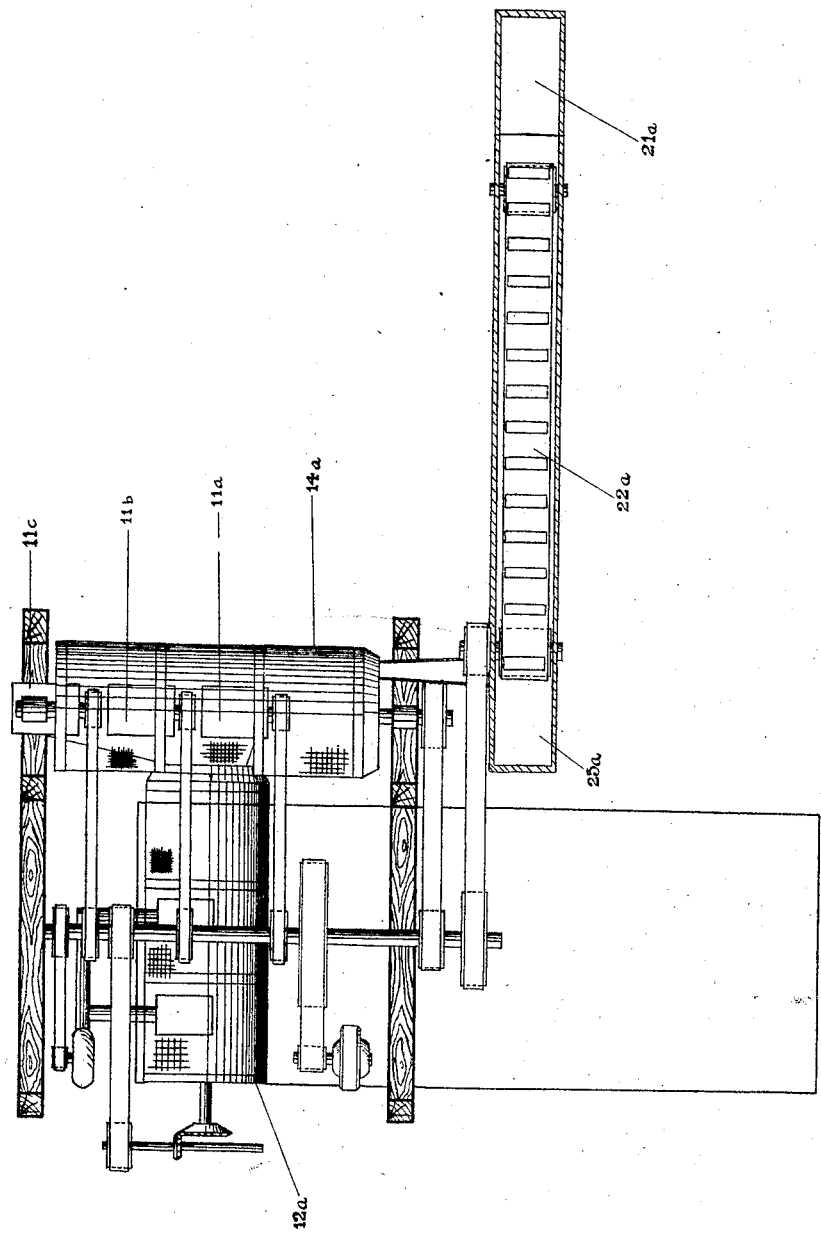

Patented Mar. 9, 1926.

1,576,244

UNITED STATES PATENT OFFICE.

GEORGE A. NEHRHOOD, OF CHICAGO, ILLINOIS, ASSIGNOR TO CALIFORNIA ALMOND CONFECTIONS COMPANY, OF LONG BEACH, CALIFORNIA, A CORPORATION.

MEANS FOR SHELLING NUTS.

Application filed October 13, 1922. Serial No. 594,280.

*To all whom it may concern:*

Be it known that I, GEORGE A. NEHRHOOD, a citizen of the United States, residing at Chicago, in the county of Cook and State of Illinois, have invented certain new and useful Improvements in Means for Shelling Nuts, of which the following is a specification.

My invention relates to the art of hulling and shelling nuts, and has for its principal object the provision of improved means for expediting the shelling and sorting of nuts whereby a substantial reduction in the cost of preparing nut meats for the market may be effected.

Prior to this invention the nut meats of nuts having relatively hard shells, for example, almonds, filberts, and the like, have been prepared for market largely by the use of hand labor; the nuts being cracked by the use of machinery and the nut-meats separated from the broken shells and sorted as to size by means of hand labor. The cost of hand labor in shelling the nuts, therefore, constitutes a large proportion of the market price of the product. This labor cost has, furthermore, made it impractical to recover the relatively small pieces of nut-meats from the broken shells. It is therefore one of the objects of my invention to overcome the above conditions by the provision of improved means which operate to disintegrate the shells of the nuts with a minimum breakage of the nut-meats, and automatically sort the nut-meats as to size and separate them from the disintegrated shells.

The principal object of the invention is to provide a method of separating the kernels from the shells of cracked nuts by first grading the material, kernels or nut meats and shell fragments, and then subjecting each grade or class of material to a suitable air lift separation and to treatment which insures dislodgment from the shells of any kernels which may have a tendency to stick in the shells.

A preferred apparatus for carrying out the method of my invention is illustrated in the accompanying drawings wherein like characters of reference designate corresponding parts, and wherein—

Fig. 1 is a plan view of a nut-shelling apparatus constructed in accordance with my invention;

Fig. 2 is a side view in elevation of the structure shown in Fig. 1.

Fig. 3 is a view in elevation of the other side of the apparatus.

Fig. 4 is a view in elevation looking from the point indicated by line 4—4 of Fig. 1.

Fig. 5 is a view in elevation of the other end of the apparatus.

Fig. 7 is a longitudinal section taken on line 7—7 of Fig. 1, looking in the direction indicated by the arrows.

Figs. 15 and 16 are diagrammatic views in side elevation and in plan, respectively, of a modified arrangement of sorting and shelling apparatus which may be advantageously used in connection with a battery of disintegrating members, whereby nuts of different sizes may be disintegrated simultaneously.

Like chracters of reference designate like parts in the several figures of the drawings.

Figure 6:
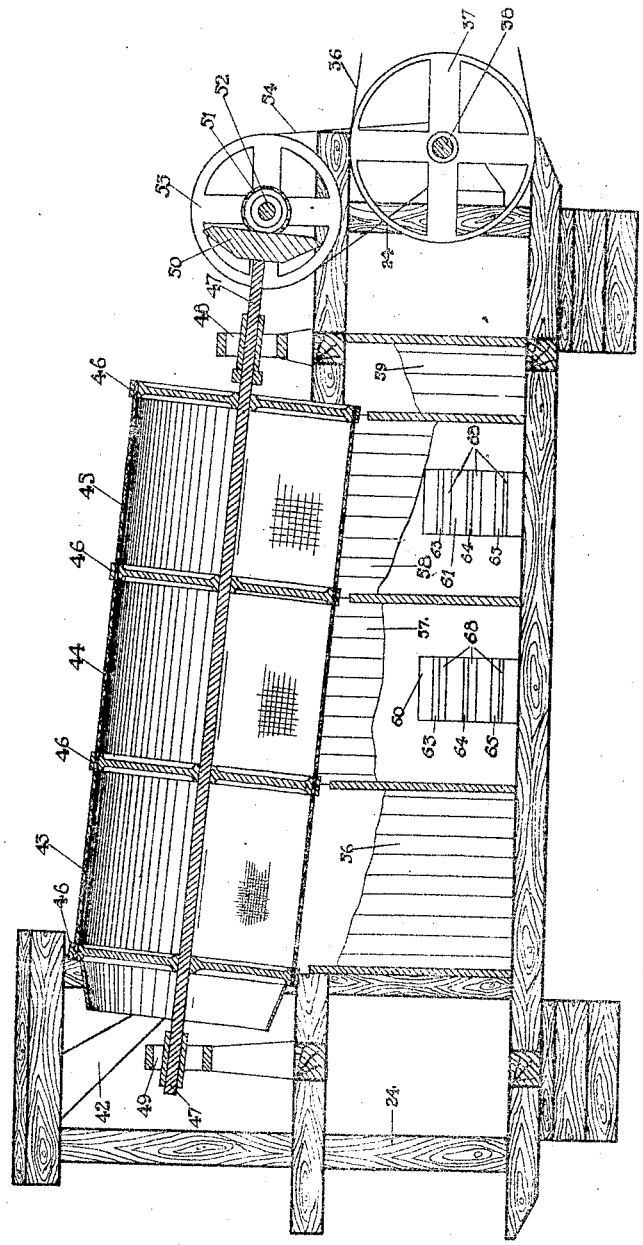
Fig. 6 is a longitudinal section taken on line 6—6 of Fig. 1, looking in the direction indicated by the arrows.
Figure 9:
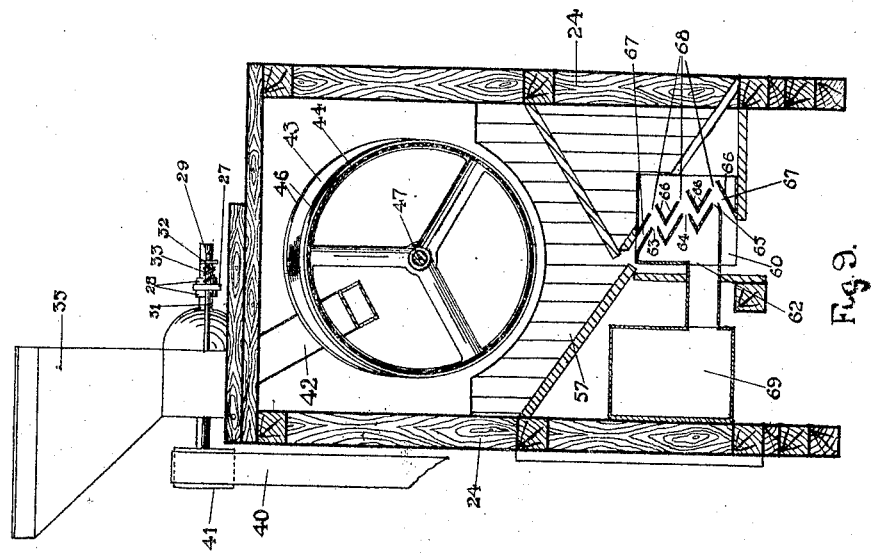
Fig. 9 is a cross-sectional view through the nut shelling apparatus, illustrating the construction of the means for winnowing the shells from the nut-meats, this figure being illustrative of the construction taken through the apparatus on either of the lines 9—9.
Figure 8:
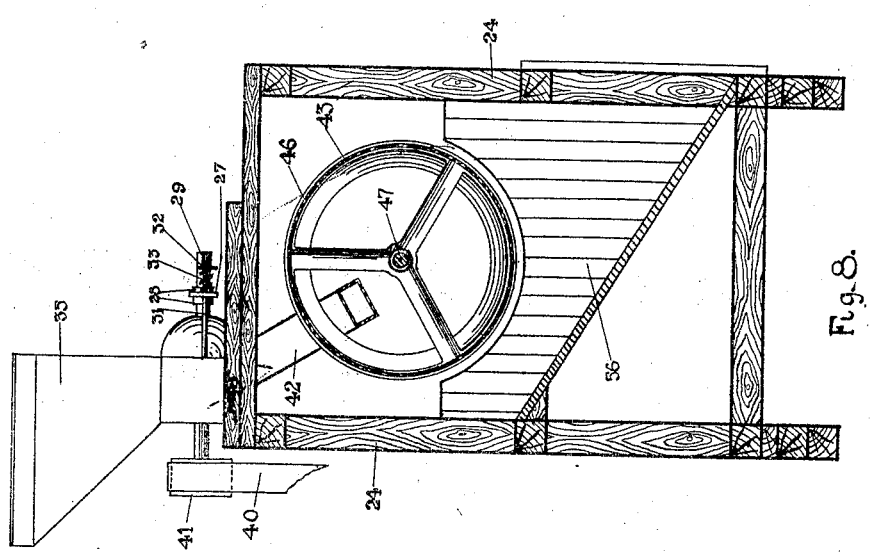
Fig. 8 is a cross-section taken on line 8—8 of Fig. 1.
Figure 10:
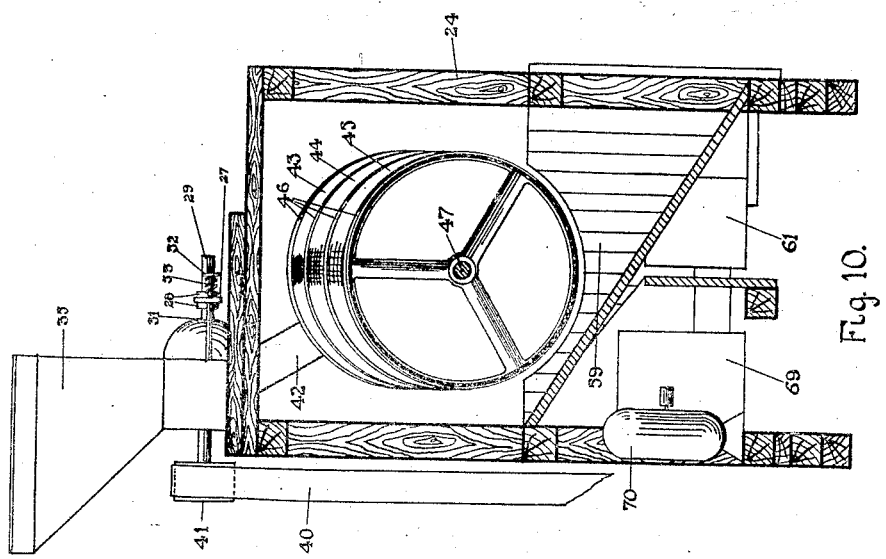
Fig. 10 is a cross section taken on line 10—10 of Fig. 1, looking in the direction indicated by the arrows.

Referring first to Figs, 1 to 14, inclusive of the drawings, wherein I have shown one specific embodiment of my invention.

The invention may be described generally as consisting of sorting means 10, for sorting nuts as to size before the shells are removed, shell-disintegrating means 11, sorting means 12 for sorting the nut-meats and disintegrated shells, as to size, and means indicated by the reference character 13 for winnowing the disintegrated nut shells from the nut-meats.

Figure 14:
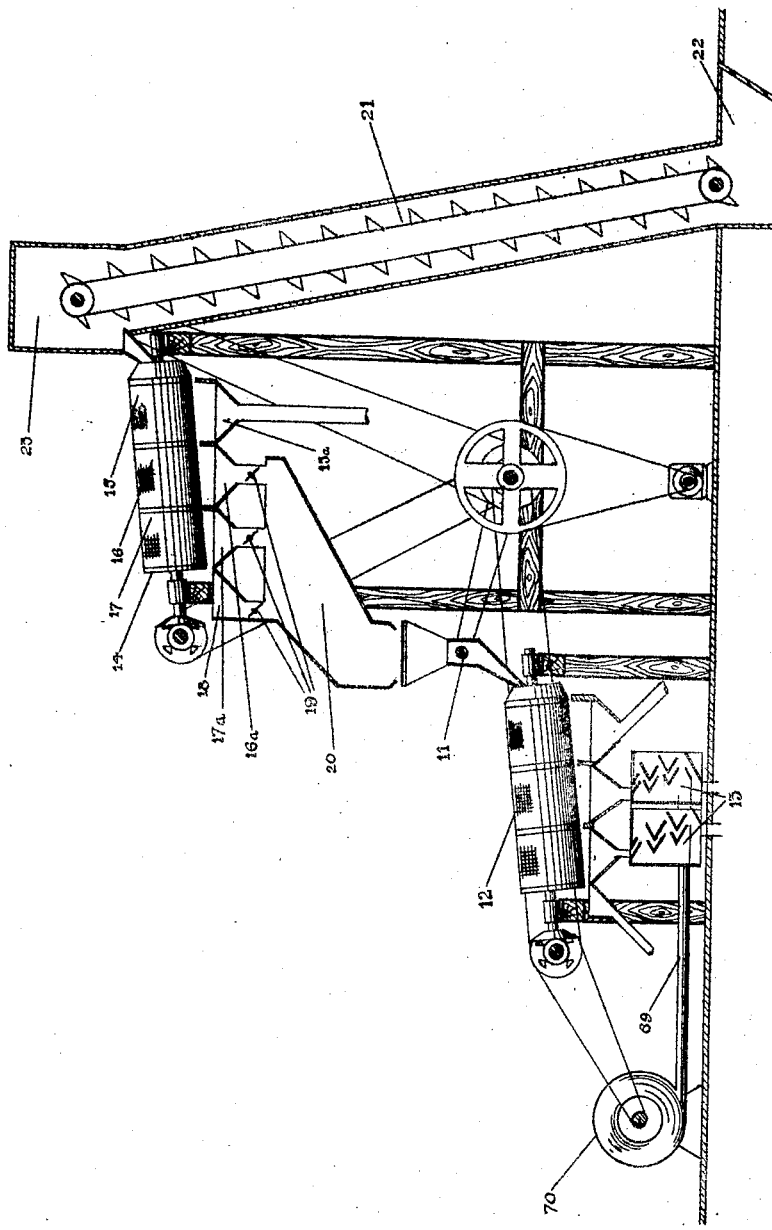
Fig. 14 is a diagrammatic representation of a preferred arrangement of sorting and shelling apparatus when such apparatus is provided with a single nut-disintegrating member.

The nuts are first dried and sorted as to size, and then pass through the shelling apparatus. The drying of the nuts may be accomplished by any suitable or preferred means, and likewise any suitable means may be employed for sorting the nuts as to size. In this connection I preferably provide a sorting apparatus 10 consisting of a revoluble drum 14 made up of a plurality of screens of different mesh. The number and size of screens employed, may, obviously, be varied to suit the size or character of nuts being shelled. In Fig. 14 I have shown the drum 14 made up of three screens 15, 16 and 17. The mesh of screen 15 is of sufficient size to permit the chaff and small particles of nut shells and husks to pass into the hopper 15$^a$, but will prevent the passage of nuts. The small nuts pass through the screen 16 into the hopper 16$^a$. The larger nuts pass through screen 17 into hopper 17$^a$, and the nuts of larger size pass out the end of the drum into a hopper 18. The hoppers for receiving the nuts from the sorting drum 14 are preferably provided at their discharge ends with suitable valves 19 whereby nuts of any particular size may be delivered by means of the chute 20 to the shelling apparatus.

The construction and operation of the sorting drum above referred to except as to size of the screens, is the same as the sorting drum of the shelling apparatus and therefore shown only diagrammatically herein, together with a suitable bucket conveyor 21 for carrying the nuts from the bin 22 to a receiving hopper 23 of the sorting apparatus.

The shell disintegrating means 11, sorting drum 12 and the means 13 for winnowing the disintegrated shells from the nut-meats are supported on a frame 24 and are so arranged with relation to each other that the nut-meats and shells passing out of the disintegrator 11 will pass to their respective bins, the nut-meats being sorted into grades of different sizes.

Figure 12:
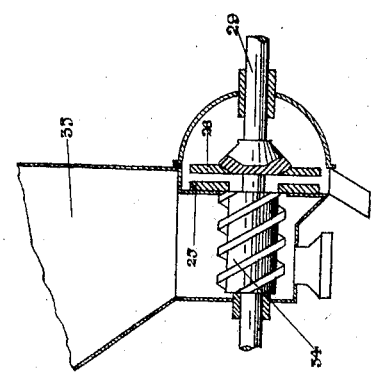
Fig. 12 is a vertical section taken through the nut-disintegrating means.
Figure 13:
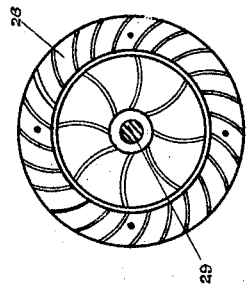
Fig. 13 is a face view of a rotary member employed in connection with the disintegrating means.
Figure 11:
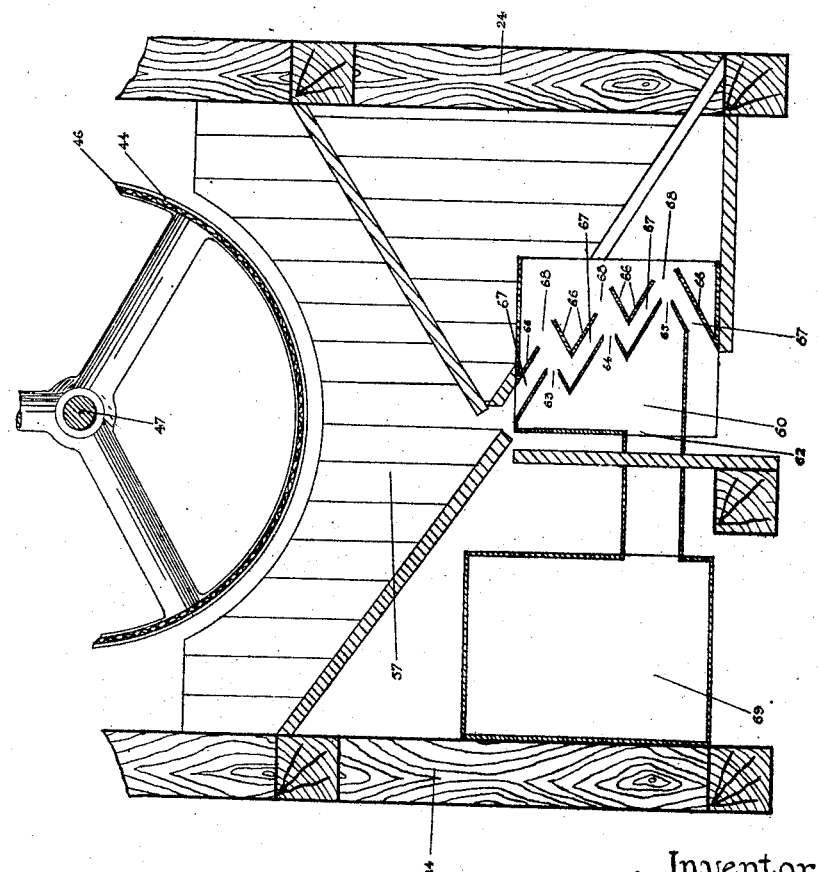
Fig. 11 is a view, made on a somewhat larger scale, of the lower portion of the structure shown in Fig. 9.

The disintegrator 11 consists preferably of a stationary ring 25 (Figs. 12 and 13) formed with suitable serrations on its outer face and a revoluble plate 26 having similar serrations on its inner face and so disposed with relation to the stationary ring that the shell of a nut entering the space between them will be disintegrated. In order to provide for a thorough disintegration of the nut shell and at the same time reduce the breakage of the nut-meats to a minimum, I provide means of adjustment whereby the space between the disintegrating members 25 and 26 may be increased or diminished, as desired, so as to accommodate nuts of different sizes. This means of adjustment, preferably, consists of a bar 27 loosely connected by means of collars 28, 28 (Fig. 1) to shaft 29, to which the revoluble member 26 is fixed, and is supported at its ends on rods 30 and 31. The outer end of the rod 31 is threaded for the reception of a hand-nut 32. A coiled spring 33 is interposed between the hand-nut and the movable bar 27. With this construction it will be seen that, when the hand-nut 32 is screwed down on the rod 31, the revoluble disintegrating plate 26 will be moved toward the stationary ring 25 in a manner to reduce the space between them.

If desired, the hand-nut may be screwed outwardly on the rod 31 so that the revoluble plate 26 may be moved outward to increase said space. The coiled spring 33 is sufficiently stiff to maintain the revoluble disintegrating plate in its desired adjusted position during the shelling of nuts of a predetermined size, but will yield so as to permit the revoluble disintegrating plate to move outwardly in the event that a stone, or the like, should find entrance to the space between said disintegrating members.

The nuts are delivered, one at a time, through a central opening in the stationary disintegrating plate 25 into the space between the disintegrating plates by means of a worm 34 splined to the shaft 29 and arranged in the discharge end of a hopper 35. The worm and the revoluble disintegrating plates are continuously driven by a driving connection with a suitable motor (not shown). This driving connection is preferably as follows: A belt 36 connects said motor with a relatively large pulley 37 secured to a power shaft 38. The power shaft, at one end, carries a small pulley 39 which is connected, by belts 40, to a pulley 41 (Fig. 3), on shaft 29. The pulleys 39, 41 and the belt 40 are preferably of such width that the revoluble disintegrating plate 26 may be subjected to its maximum range of adjustment without danger of impairing the driving connections.

The disintegrated nut shells together with the nut-meats of various sizes are delivered from the disintegrating member by means of a chute 42 into a sorting drum 12. This drum is in effect a cylindrical screen made up of a plurality of screens, preferably three, 43, 44 and 45, of different sized mesh, secured to spider members 46, which in turn are attached to a shaft 47. The shaft 47 operates in bearings 48 and 49, which are so disposed as to support the drum in an inclined position, whereby the nut-meats and disintegrated shells received at the upper end of the drum will move across the respective screens toward the other end of the drum. The drum is rotated by means of a bevel gear 50 secured to the shaft 47 and meshes with a bevel pinion 51 on shaft 52, the latter of which carries a pulley 53 driven by a belt 54 which connects a pulley 55 on shaft 38. Suitable bins 56, 57, and 58, are provided below the respective screens of the sorting drum 12 to receive the nut-meats and shells of such size as may pass through the screens. A bin designated by the reference character 59 is provided to receive the pieces of shells that are too large to pass through any one of the three screens. The screen 43 is arranged at the upper end of the drum, and is of such mesh as to permit the chaff and small particles of disintegrated shells to pass through the screen into the bin 56. The nut-meats of a predetermined size, together with the similar sized pieces of shell, pass through the next adjacent screen 44 into the bin 57, and the larger nut-meats and pieces of shell pass through the screen 45 into the bin 58. The particles of shell that are too large to pass through any one of the screens are discharged from the lower end of the drum into the bin 59.

The apparatus is preferably constructed with a sufficient number of screens of different mesh to insure the proper sorting of the unbroken nut-meats into grades of various sizes and likewise sort the broken nuts as to size. The particular number and size of screens employed will depend upon the character of the nuts being shelled. When constructing apparatus of this character for sorting and separating nut-meats, for example, of pecans or other higher-priced nuts from their disintegrated shells, a larger number of screens would ordinarily be used, there being various grades of such nuts, ranging in size from very small pieces to the whole kernels of different sizes. The reticular surface of the screen and the agitation to which the nut-meats and shells are subjected during the rotation of the sorting drum 12 provides an effective means for removing portions of disintegrated shells, having a tendency to adhere to the nut-meats.

The nut meats and particles of shells pass from the bins 57 and 58 through winnowing devices 60 and 61, respectively (Figs. 6, 9, 10, 11 and 14), in which draughts of air are employed to winnow the shells from the nut meats. The winnowing devices consist in each case of an air chamber 62 provided with a plurality of transverse nozzles 63, 64 and 65, arranged adjacent a plurality of angularly disposed baffle plates 66. The angularity of the baffle plates corresponds to the contour of the adjacent wall of the air chamber 62 in which the air nozzles are formed and thereby provide a circuitous passage 67 through which the nut-meats pass, the particles of shells being carried by the draughts of air through the openings 68 between the baffle plates. The air chambers connect with a conduit 69 and are supplied with the requisite quantity of air under pressure from a fan 70, the fan being driven by means of a belt connection 71 with a pulley 72 on the power shaft 38. The circuitous passage 67 retards the movement of the nut-meats and directs them across the several air nozzles in such manner as to make it practical to effect a thorough separation of the shells from the nut-meats with a relatively low air pressure. The arrangement of air nozzles and baffle plates shown in the drawings is particularly suitable for use in devices of this character in which the separation of the shells from the nut-meats is effected by forced draughts of air. It will be obvious, however, that induced currents of air may be employed for the above purpose, and the construction and arrangement of such nozzles and baffle plates may be varied to suit such air currents without departure from the spirit of this invention.

Figure 15:
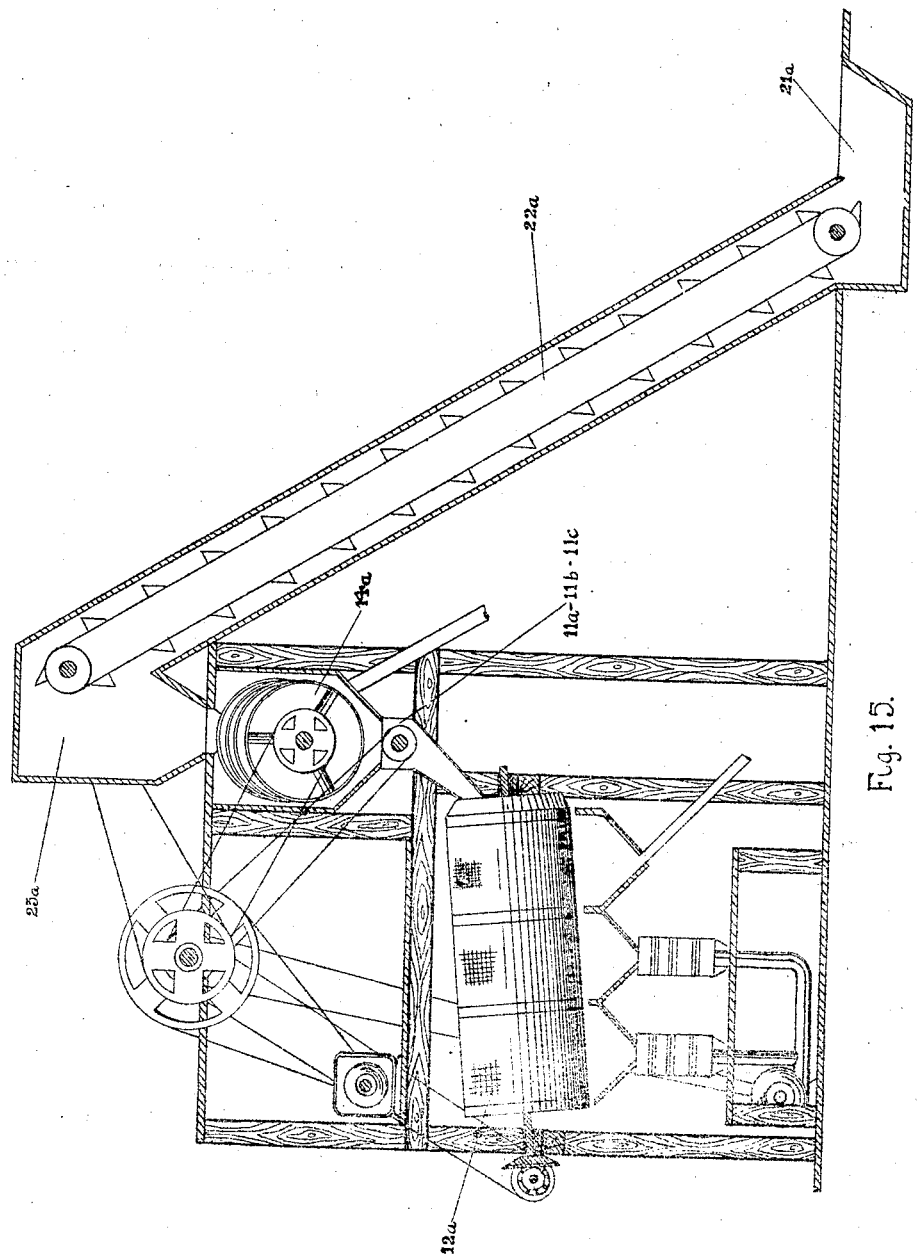

In Figs. 15 and 16 of the drawings I have shown somewhat diagrammatically a modified arrangement of the devices which, in general, are substantially the same in construction as the devices previously described, whereby nuts, before the shells are disintegrated, are sorted as to size, and the nuts passed through separate disintegrators adjusted to accommodate nuts of such sizes. With such arrangement, the capacity of the apparatus is considerably increased, since the shells of both relatively large and small nuts may be disintegrated simultaneously and the sorting and separation of the nut-meats from the shells effected at a nominal cost. In the modified apparatus the nuts, after being dried, are placed in a bin 21ª from which bin they are picked up by a suitable conveyor 22ª and delivered into a receiving hopper 23ª. From the hopper the nuts pass into a screen sorting drum 14ª of substantially the same construction as the sorting drums illustrated in the preceding figures. From this drum the sorted nuts are delivered into receiving hoppers of separate disintegrators designated 11ª, 11ᵇ and 11ᶜ. The nut-meats and disintegrated shells of the different sized nuts are delivered through a suitable chute into a sorting drum 12ª. The sorting drum 12ª differs from the sorting drum 12, shown in the preceding figures, only in that it is made up of a larger number of screens of suitable mesh to accommodate greater variations in the sizes of the nut-meats.

While I have illustrated an apparatus for practicing the method of my invention consisting of certain specific constructions and arrangements of parts, it will be obvious that these constructions and arrangements may be varied without departure from the invention disclosed. I therefore contemplate all of such modified constructions as will come within the scope of the appended claims.

The invention has been described specifically in connection with the removal of the nut meats from the inner shell of the nuts though it will be obvious that the apparatus is not limited in its operation to nuts in which the outer husks have been previously removed. When nuts containing their husks are fed into the apparatus the husks and inner shell are disintegrated simultaneously. If it be desired to remove the husks only, this may be accomplished by suitable adjustment of the disintegrator devices so as to discharge the nut after the outer husks have been removed.

I claim:

1. Method of separating the shell fragments of cracked nuts from the kernels of the nuts which consists in screening the material to divide the same into classes as to size and subjecting the material of each such class to treatment as follows: causing the material to be moved by gravity and to impact against a surface to dislodge the kernels from the shells, and blowing away the shells by an air current directed against the material at said place of impact.

2. Method of separating the shell fragments of cracked nuts from the kernels of the nuts which consists in screening the material to divide the same into classes as to size and subjecting the material of each such class to treatment as follows: causing the material to be tumbled downwardly through a passageway which arrests the movement of the material at intervals and produces impacts dislodging the kernels from the shells, and, at different levels, blowing the shell fragments out of the stream of material by air currents.

3. Method of separating the shell fragments of cracked nuts from the kernels of the nuts which consists in screening the material to divide the same into classes as to size and subjecting the material of each such class to treatment as follows: causing the material to be tumbled downwardly through a passageway which arrests the movement of the material at intervals and produces impacts dislodging the kernels from the shells, and, at different levels, blowing the shell fragments out of the stream of material by air currents directed against the stream of material transversely thereof.

4. Method of separating the shell fragments of cracked nuts from the kernels of the nuts which consists in screening the material to divide the same into classes as to size and subjecting the material of each such class to treatment as follows: causing the material to be tumbled downwardly through a passageway which arrests the movement of the material at intervals and produces impacts dislodging the kernels from the shells, and, at different levels, blowing the shell fragments out of the stream of material by air currents directed against the stream of material transversely thereof at the places where said impacts occur.

5. Method of separating the shell fragments of cracked nuts from the kernels of the nuts which consists in screening the material to divide the same into classes as to size and subjecting the material of each such class to treatment as follows: causing the material to be moved downwardly by gravity through a zigzag passageway which arrests the movement of the material and reverses its direction of flow at intervals to produce a tumbling movement and series of impacts which dislodge the kernels from the nuts, and blowing the shell fragments out of the material by air currents directed across the stream at the places where the impacts and reversals of the stream occur.

GEORGE A. NEHRHOOD.